United States Patent [19]

Malwitz et al.

[11] Patent Number: 5,089,535

[45] Date of Patent: Feb. 18, 1992

[54] THERMOPLASTIC COMPOSITIONS FOR WATER SOLUBLE FOAMS

[75] Inventors: Nelson E. Malwitz, Brookfield, Conn.; Shau-Tarng Lee, Oakland, N.J.

[73] Assignee: Sealed Air Corporation, Saddle Brook, N.J.

[21] Appl. No.: 601,260

[22] Filed: Oct. 22, 1990

[51] Int. Cl.⁵ .................. C08F 16/06; C08J 9/14
[52] U.S. Cl. ...................... 521/141; 521/56; 521/79
[58] Field of Search ................ 521/56, 79, 141

[56] References Cited

U.S. PATENT DOCUMENTS

| | | |
|---|---|---|
| 3,190,843 | 6/1965 | Hofelmann et al. ........... 521/134 |
| 3,695,989 | 10/1972 | Albert ........................ 521/141 |
| 3,962,155 | 6/1976 | Usamoto et al. ............. 521/84.1 |
| 4,104,208 | 8/1978 | Kido et al. .................. 521/141 |
| 4,207,221 | 6/1980 | Tobias et al. ................ 521/142 |
| 4,218,511 | 8/1980 | Hahn et al. .................. 521/57 |
| 4,314,035 | 2/1982 | Hobes et al. ................ 521/141 |
| 4,506,037 | 3/1985 | Suzuki et al. ................ 521/140 |
| 4,575,532 | 3/1986 | Schmukler et al. .......... 525/57 |
| 4,600,746 | 7/1986 | Schmukler et al. .......... 525/57 |
| 4,618,648 | 10/1986 | Marten ........................ 525/60 |
| 4,642,267 | 2/1987 | Creasy et al. ................ 521/141 |
| 4,663,358 | 5/1987 | Hyon et al. .................. 521/141 |
| 4,675,360 | 6/1987 | Marten ........................ 525/60 |
| 4,692,473 | 9/1987 | Wright et al. ................ 521/72 |
| 4,778,829 | 10/1988 | Ichimura et al. ............ 521/56 |
| 4,782,097 | 11/1988 | Jain et al. .................... 521/141 |
| 4,859,711 | 8/1989 | Jain et al. .................... 521/141 |

FOREIGN PATENT DOCUMENTS 0152180  8/1985  European Pat. Off. .
1030234  5/1986  United Kingdom .

OTHER PUBLICATIONS

Material relating to the Vinex TM Thermoplastic Polyvinyl Alcohol Copolymer Resins and a copy of Famili, Amir et al., "Novel Thermoplastic Polyvinyl Alcohol Copolymer (Vinex)," Air Products and Chemicals, Inc., Allentown, Pa.

Wilder, R.V., "'Disappearing' Package: Pipe Dream or Savior?" *Modern Plastics International*, Sep., 1989.

"Genuine No Waste Pack," *Packaging Week*, Jan. 13, 1988.

"Belland Process Produces Plastics Which Can Dissolve to Order," source unknown.

"Plastics for Today's Technical Problems and Environmental Concerns-The Answer is in the Solution," Belland.

*Primary Examiner*—John Kight, III
*Assistant Examiner*—John M. Cooney, Jr.
*Attorney, Agent, or Firm*—Bell, Seltzer, Park & Gibson

[57] ABSTRACT

Thermoplastic compositions of internally plasticized polyvinyl alcohol material and a low molecular weight alcohol are provided that can be extruded into water soluble biodegradable foams. The compositions can be modified to provide foams that have varying degrees of water solubility and a broad range of physical characteristics.

25 Claims, No Drawings

THERMOPLASTIC COMPOSITIONS FOR WATER SOLUBLE FOAMS

FIELD OF THE INVENTION

This invention relates to nonaqueous thermoplastic compositions of polyvinyl alcohol material that can be melt extruded into water soluble biodegradable foams.

BACKGROUND OF THE INVENTION

Environmental problems such as overflowing landfills are aggravated by the stability and longevity of some plastic materials. Recently, a great deal of attention has focused on developing plastics from water soluble biodegradable polymers such as polyvinyl alcohol (PVOH) PVOH is prepared by hydrolyzing polyvinyl esters, e.g. polyvinyl acetate Depending on the amount of hydrolysis, PVOH will have varying degrees of water solubility. The environmental appeal of PVOH is that the resulting solute is biodegradable.

The utility of polyvinyl alcohol has been severely limited by the fact that it decomposes before melting. For example, melt extrusion processing of plastics requires formation of a chemically stable "melt" of the polymer that resolidifies upon cooling without losing its desirable characteristics. Until recently, means for melt extruding materials possessing the desirable characteristics of polyvinyl alcohol have not been available.

Thermoplastic materials offering the desirable characteristics of polyvinyl alcohol are described in U.S. Pat. Nos. 4,675,360 and 4,618,648. Those references describe copolymer compositions of PVOH and poly-(alkyleneoxy)acrylate that are reportedly extrudable into solid films. The PVOH copolymer compositions are thermoplastic yet retain PVOH's water solubility, biodegradability and strength characteristics.

Similarly, U.S. Pat. Nos. 4,600,746 and 4,575,532 describe polyvinyl alcohol alloys that have good separation of melting and decomposition points and are useful as gas barrier materials. Among other things, the materials can be extruded into gas barrier films, sheets, tubings, coatings, bottles and profiles The films have low gas permeability and water absorptivity characteristics.

Notwithstanding these advances, the foregoing references do not describe materials or methods for processing polyvinyl alcohol materials into foams. By foam is meant a solid plastic material of expanded cellular construction.

Foams of PVOH have been prepared, however. U.S. Pat. No. 3,695,989 describes cold water soluble foamed films fabricated from PVOH, polyvinyl pyrrolidone, and mixtures thereof. Those formulations are doctor knife casted aqueous mixtures containing foaming agents. The utility of those films is limited because they are susceptible to all forms of moisture and must be protected from rain, dew and high humidity atmosphere.

Similarly, U.S. Pat. No. 4,692,473 describes a water borne foamable composition that may incorporate minute quantities of polyvinyl alcohol. The polymer formulations of that description are always water borne and are not suitable for melt extrusion.

The foregoing references do not describe compositions of polyvinyl alcohol materials that can be extruded into foams. Nor do they describe methods whereby known compositions of polyvinyl alcohol materials can be extruded into foams. More particularly, the foregoing references do not describe a compatible blowing agent for such compositions.

A composition for extruding a foam will produce a solid plastic material having an expanded cellular construction when fabricated by melt extrusion processes. The blowing agent is a relatively volatile component mixed into the melt. When the melt is extruded, the blowing agent must volatilize out of the melt before solidification. The volatilization of the blowing agent forms gas bubbles, which give the foam its expanded cellular construction.

SUMMARY OF THE INVENTION

The present invention provides novel thermoplastic compositions comprising polyvinyl alcohol materials and a blowing agent selected from the low molecular weight alcohols. Low molecular weight alcohols were previously believed to be poor blowing agents for a polyvinyl alcohol material composition because they are highly soluble in PVOH and have relatively low volatility. It was thought that the high solubility would prevent the low molecular weight alcohols from volatilizing out of solution resulting in a soupy mixture rather than a well formed solid foam when extruded. Notwithstanding, it has now been shown that thermoplastic compositions comprising a PVOH material and a low molecular weight alcohol are readily melt extruded into water soluble biodegradable foams. For purposes of this invention, the term foam refers to a solid plastic foam having an expanded cellular construction.

The compositions of the present invention optionally further comprise diluent polymers, aging modifiers, nucleating agents and ionomer resins.

The present invention further provides novel foams having a variety of physical characteristics and varying degrees of water solubility.

It is contemplated that the foams of the present invention will supplant many traditional materials, particularly those that present solid waste problems For example, the extrudable foamable compositions of the present invention may be used as substitutes for polyethylene or polypropylene materials, particularly in the food packaging industry. The compositions of the present invention may also be used as paper substitutes, particularly where litter and disposal create ecological hazards. The present compositions may also be used as insulating, shock absorbing and surface protecting materials.

Thus, it is an object of the present invention to provide a thermoplastic composition that can be melt extruded into a water soluble foam.

It is also an object of the present invention to provide extruded foams that are water soluble and biodegradable.

It is a further object of the present invention to provide a method for melt extruding water soluble foams.

Other objects, features, and advantages of the invention will be apparent from the details of the invention as more fully described and claimed below.

DETAILED DESCRIPTION OF THE INVENTION

The present invention provides thermoplastic compositions comprising a polyvinyl alcohol material resin mixture and a blowing agent. These compositions can be fabricated into water soluble foams by the use of melt extrusion processes. More specifically, the compositions comprise: a resin mixture comprising polyvinyl alcohol material, an optional diluent polymer, and optional additives, such as nucleating agents, aging modifiers and ionomer resins; and a volatile blowing agent. Preferably, the blowing agent is a low molecular weight alcohol. Preferred low molecular weight alcohols are those with a boiling point between 46° C. and 100° C. (at standard temperature and pressure). Exemplary preferred blowing agents are methanol, ethanol, propanol, and butanol More specifically, the present invention provides thermoplastic compositions comprising: a resin mixture comprising (a) from 1 to 100% by weight of a polyvinyl alcohol material, (b) from 0 to about 90% by weight of a diluent polymer, (c) from 0 to about 20% by weight of an ionomer resin, (d) from 0 to about 2% by weight of a nucleating agent, and (e) from 0 to about 3% by weight of an aging modifier; and a blowing agent comprising a low molecular weight alcohol, said alcohol present in an amount from about 0.1 to about 0.5 parts per part resin mixture (by weight). Unless stated otherwise, all amounts listed as % by weight are % by weight of the resin mixture.

For purposes of this invention, the term polyvinyl alcohol material means a polymeric material that has a plurality of repeating vinyl alcohol groups, is at least partially water soluble, and when mixed with a blowing agent has a melting temperature below its decomposition temperature. The polyvinyl alcohol materials of the present invention include copolymers of vinyl alcohol and internal plasticizers. The incorporation of the internal plasticizers make the polyvinyl alcohol material thermoplastic yet retain many of the desirable properties of polyvinyl alcohol, e.g. water solubility, biodegradability, strength, etc. Suitable internal plasticizers include poly(alkyleneoxy) acrylates, ethylene oxide, poly(alkylene) glycols, acrylic esters, methacrylic esters, and betahydroxyalkyl acrylate esters and are present in an amount from about 5 to about 75 mole %. Preferably, it is present in an amount from about 5 to about 50 mole %.

What is meant by biodegradable is that the substance when dissolved is susceptible of being decomposed to environmentally innocuous materials by microorganisms.

As with polyvinyl alcohol, per se, the polyvinyl alcohol materials of the present invention will have varying degrees of hydrolysis of the polyvinyl ester. The amount of hydrolysis will affect the water solubility of the foam. It is contemplated that polyvinyl alcohol materials, as defined herein, having widely varying degrees of hydrolysis will be useful in the compositions of the present invention. It will be appreciated by those skilled in the art that as the degree of hydrolysis of the polyvinyl alcohol material is varied, the concentration of the other components of the composition must also be varied to account for the change in solubility. Unless stated otherwise, all compositions described herein refer to polyvinyl alcohol materials having about 88% hydrolysis of the polyvinyl ester.

Examples of polyvinyl alcohol materials are copolymers of vinyl alcohol and poly(alkyleneoxy)acrylates described in U.S. Pat. Nos. 4,675,360 and 4,618,648, which are hereby incorporated by reference. Commercially available examples of polyvinyl alcohol materials include a variety of internally plasticized polyvinyl alcohol plastics from Air Products Co. under the trade name Vinex®. A preferred resin is Vinex® 2025, a high melt index (MI=17) PVOH blend; another is Vinex® 2034, a low melt index (MI=4) PVOH blend.

Similarly, it is contemplated that the polyvinyl alcohol alloys described in U.S. Pat. Nos. 4,600,746 and 4,575,532, which are hereby incorporated by reference, will also form a thermoplastic foamable composition when mixed with the blowing agents of the present invention.

The foamable thermoplastic compositions of the present invention further comprise volatile blowing agents. For purposes of this invention, a blowing agent is a component of the composition that volatilizes out of the composition when the melt composition exits the extruder outlet die. The blowing agent, per se, volatilizes out of the composition upon extrusion to form the expanded cellular construction of the foam. Thus, suitable blowing agents are soluble in the resin mixture, but nonetheless volatilize out of the composition following extrusion.

The short chain, low molecular weight alcohols are surprisingly effective blowing agents for the subject compositions. Examples of such blowing agents are methanol, ethanol, n-propanol, isopropanol, n-butanol, and isobutanol. Additionally, blends of low molecular weight alcohols and atmospheric gases and/or simple hydrocarbons including hydrohalocarbons, are also useful as blowing agents in the compositions of the present invention.

The blowing agents of the present invention have the added advantage of lowering the temperature at which the composition solidifies, which facilitates lower extrusion temperatures, speeds up the fabrication process and provides corresponding economies.

Another surprising feature of the blowing agents of the present invention is that they depress the freezing point of the polymer mixture in the extruder. This further separates the freezing point of the melt in an extruder from the decomposition point. Accordingly, the present invention provides compositions that can be extruded into foams that might not be otherwise extrudable because of the proximity of the melt temperature and the decomposition temperature.

Additionally, this depression of the melt temperature provided by the blowing agents of the present invention means that the extruder can be run at lower temperatures, particularly at the die, which allows a rapid setting of the polymer mix outside the foaming die as the blowing agent volatilizes. That phenomenon substantially improves (increases) the operating temperature window in which foaming will occur.

The selection and concentration of the blowing agent can be varied to modify the physical characteristics of the foam. For example, a high concentration of blowing agent would produce a less dense foam. Similarly, the density and cell size of the foam will be affected by the volatility of the particular blowing agent. A concentration range of about 0.1 to about 0.5 parts blowing agent per part resin mixture (by weight) is acceptable for the compositions of the present invention. A preferred range is about 0.1 to about 0.35 parts per part resin mixture. A more preferred range is about 0.15 to about 0.33 parts per part resin mixture.

The thermoplastic compositions of the present invention optionally comprise a diluent polymer. Diluent polymers are polymers that are sufficiently compatible with the polyvinyl alcohol material that they can be blended into a thermoplastic resin mixture, combined with the blowing agent, and extruded into a foam. Suitable diluent polymers include aryl and olefinic polymers. Examples of aryl polymers include polystyrene, its substituted derivatives, and copolymers thereof Examples of olefinic polymers include polyethylene, polypropylene, their substituted derivatives, and copolymers thereof Diluent polymers may be added for structural purposes Such polymer blends enable the fabrication of foams that have certain physical characteristics dry and other characteristics after being wetted. The selection and relative concentration of the diluent polymer will be dictated in part by the end uses anticipated and amount of water solubility desired for the product. For example, if the diluent polymer is polystyrene (e.g. Huntsman 203, a high melt index polystyrene available from Huntsman Chemical Corp.) the composition will produce a stiff and rigid foam; if polypropylene is used (e.g. PROFAX 6823, Himont Corp.), a softer and more flexible foam will result; and if the diluent polymer is polyethylene (e.g. USI 951, a low density polyethylene available from Quantum Chemical Corp.), a flexible and less costly product will result.

The subject compositions optionally include nucleating agents that ensure uniform cell size and reduce the existence of surges and voids in the foam. Preferred nucleating agents include diatomaceous earth, talc and mixtures of sodium bicarbonate and citric acid. A commercially available source of the latter nucleating agent is Hydrocerol CF available from Boehringer Ingelheim Corporation. The compositions of the present invention comprise up to about 2% by weight nucleating agent. A preferred range of nucleating agent is about 0.1–0.6% by weight of the resin mixture.

Aging modifiers may be incorporated to alter the gas permeability of the cells, thereby affecting the rate at which the trapped blowing agent is exchanged with ambient air. When a foam is extruded, residual blowing agent is trapped within the cells of the foam. For safety and environmental reasons, it is often desirable to enhance the removal of the blowing agent from the foam. Additionally, it is desirable to remove the blowing agent quickly to achieve final product stability.

The resin mixtures of the present invention comprise up to about 3% by weight aging modifier. A preferred range is about 0.5 to about 2% by weight aging modifier. A preferred aging modifier is glycerol monostearate, a commercially available example of which is ATMOS 953 from Witco Corp.

Thermoplastic compositions of the present invention optionally comprise ionomer resins. Ionomers are I5 copolymers of ethylene and a vinyl monomer with an acid or acid salt group. They are cross linked polymers in which the cross linkages are ionic as well as covalent bonds. *Hawley's Condensed Chemical Dictionary*, 645, (11th ed. 1987).

Ionomers enhance the compatibility of the hydrophilic polyvinyl alcohol copolymer with the hydrophobic aryl or olefinic polymers and so increase the concentration of diluent polymer that can be combined with the polyvinyl alcohol material in the resin mixture. Thus, for resin mixtures comprising about 25% by weight diluent polymer or more, the addition of at least about 5% by weight ionomer is preferred. Such mixtures generally require no more than about 20% by weight ionomer resin. Preferably, the ionomer resin will comprise less than 20% by weight. Most preferably, the ionomer resin concentration will comprise about 5% to about 10% by weight of the resin mixture. A variety of ionomers are commercially available from Du Pont under the trade name Surlyn ®.

The thermoplastic compositions of the present invention are extrudable into foams, i.e. capable of being fabricated into foams by melt extrusion methods disclosed herein. The compositions can be formulated to produce foams having a broad range of water solubility characteristics. The amount and type of polyvinyl alcohol material in the compositions will determine the solubility of the foam.

Unless otherwise stated, all resin mixtures described below optionally further comprise up to about 2% by weight nucleating agent and up to about 3% by weight aging modifier.

A foam that is entirely water soluble is fabricated from a thermoplastic composition comprising: a resin mixture comprising about 95 to 100% by weight polyvinyl alcohol material; and about 0.1 to about 0.5 parts blowing agent per part resin mixture. By entirely water soluble is meant a foam that leaves no residual components all of the foam material dissolves.

A foam that is substantially water soluble is fabricated from thermoplastic compositions comprising: a resin mixture comprising about 75 to about 99% by weight polyvinyl alcohol material and about 1 to about 25% by weight diluent polymer; and about 0.1 to about 0.5 parts blowing agent per part resin mixture. By substantially water soluble is meant a foam that dissolves in water but leaves behind minute residual material. For example, a foam comprising about 80% by weight polyvinyl alcohol material will dissolve but leave a fine hairlike residue consisting of the non-soluble diluent polymer.

A foam that is partially soluble in water is fabricated from thermoplastic compositions comprising: a resin mixture comprising about 40 to about 75% by weight polyvinyl alcohol material (88% hydrolysis), about 25 to about 60% by weight diluent polymer and up to about 20% by weight of an ionomer resin; and about 0.1 to about 0.5 parts blowing agent per part resin mixture. By partially water soluble is meant a foam that retains some superstructure but in diminished form. For example, a foam comprising about 60% by weight polyvinyl alcohol material (88% hydrolysis) would dissolve in water but leave a thin net-like structure of diluent polymer.

Finally, a foam that is minimally soluble in water is fabricated from a thermoplastic composition comprising: a resin mixture comprising about 5 to about 40% by weight polyvinyl alcohol material, about 60 to about 90% by weight diluent polymer, and up to about 20% by weight of an ionomer resin; and about 0.1 to about 0.5 parts blowing agent per part resin mixture. By minimally soluble is meant a foam that will not substantially alter its discernible structure but will nonetheless lose some structural integrity, e.g. become more porous.

The present invention further provides methods for fabricating these thermoplastic compositions into water soluble biodegradable foams. Such a method comprises: combining in the mixing section of an extruder a resin mixture comprising (a) 1 to 100% by weight of a polyvinyl alcohol material; (b) from 0 to about 90% by weight of a diluent polymer; (c) from 0 to about 20% by weight of an ionomer resin; (d) from 0 to about 5% by weight of a nucleating agent; and (e) from 0 to about 10% by weight of an aging modifier; heating that mixture under pressure to form a chemically stable melt; injecting into the mixing section of the extruder from about 0.1 to about 0.5 parts blowing agent per part resin mixture;

thoroughly working the blowing agent into solution with the resin mixture in the mixing section of the extruder; and allowing the composition to extrude under increased pressure and heat through a die such that it forms a foam.

All sections of the extruder, i.e. melt section, injection section, and die section are at elevated temperature and pressure Typical temperatures are in the range of about 200° to about 500° C. Typical pressures are in the range of about 500 to about 2000 psi.

Examples of water soluble foams, and foamable compositions and process conditions for the fabrication thereof are illustrated in Tables I and II.

The density of the foams of the present invention will vary depending on the relative concentration of the blowing agent. Table I illustrates that effect.

It will be appreciated by those skilled in the art that it is possible to further vary physical characteristics of the foams of the present invention by varying the extrusion conditions, e.g. shear history and die configurations.

TABLE I
EFFECT OF BLOWING AGENT LEVEL

| Resin Mixture | % by weight |
|---|---|
| Polyvinyl alcohol material (Vinex ® 2025) | 70 |
| Polypropylene (PROFAX 6823) | 27 |
| Ionomer (Surlyn ® 9020) | 2 |
| Nucleating agent (Hydrocerol CF) | 1 |

| Blowing Agent | Parts Blowing Agent Per Parts Resin Mix | Foam Density (kg/m$^3$) |
|---|---|---|
| Methanol | .15 | 640 |
| Methanol | .18 | 544 |
| Methanol | .22 | 272 |
| Methanol | .26 | 208 |
| Methanol | .29 | 144 |
| Methanol | .33 | 96 |

| Extruder | |
|---|---|
| Melt Section | 420° F. |
| Injection Section | 350° F. |
| Die Section | 325° F. |
| Die Pressure | 1000 psi |

TABLE II
COMPOSITIONS FOR WATER SOLUBLE FOAMS

| Ingredients (% by weight) | Formulation | | | | | |
|---|---|---|---|---|---|---|
| | 1 | 2 | 3 | 4 | 5 | 6 |
| Polyvinyl alcohol material (Vinex ® 2034) | 99.5 | | | 60 | 60 | |
| Polyvinyl alcohol material (Vinex ® 2025) | | 70 | 80 | | | 95 |
| LD Polyethylene (USI 951) | | 20 | | | | |
| Polypropylene (PROFAX 6823) | | | 10 | 38 | 30 | |
| Polystyrene (Huntsman 203) | | | | | | 5 |
| Nucleating agent (Hydrocerol CF) | .5 | .5 | .5 | .5 | .5 | .5 |
| Aging modifier (Atmos 150) | | 1 | 1 | 1 | 1 | |
| Ionomer (Surlyn ® 9020) | | 10 | 10 | 2 | 10 | |
| Blowing Agent* (methanol:isopropanol [1:1]) | 20 | 20 | 20 | 20 | 20 | 20 |

*(parts per hundred part resin mixture by weight)

That which is claimed is:

1. A thermoplastic foamable composition comprising:
   (a) a resin mixture comprising polyvinyl alcohol material; and
   (b) a blowing agent comprising a low molecular weight alcohol present in an amount from about 0.05 to about 0.5 parts per part resin mixture by weight.

2. The thermoplastic composition of claim 1 wherein the resin mixture further comprises:
   (a) from 0 to about 90% by weight of a diluent polymer,
   (b) from 0 to about 20% by weight of an ionomer resin,
   (c) from 0 to about 2% by weight of a nucleating agent, and
   (d) from 0 to about 3% by weight of an aging modifier;
   wherein at least one of the above is present in an amount greater than 0% by weight.

3. The thermoplastic composition of claim 1 wherein the polyvinyl alcohol material is a copolymer of polyvinyl alcohol and an internal plasticizer, wherein the plasticizer is present in an amount up to about 75 mole %.

4. The thermoplastic composition of claim 1 wherein the polyvinyl alcohol material is a copolymer of polyvinyl alcohol and an internal plasticizer, wherein the internal plasticizer is selected from the group consisting of poly(alkyleneoxy) acrylates, ethylene oxide, polyalkylene glycols, acrylic esters, methacrylic esters, and betahydroxyalkyl acrylate esters and is present in an amount from about 5% to about 50%.

5. The composition of claim 2 wherein said diluent polymer is selected from the group consisting of homo- and co-polymers of polyethylene, polypropylene, and polystyrene.

6. The composition of claim 1 wherein the blowing agent is selected from the group consisting of methanol, ethanol, n-propanol, isopropanol, n-butanol, and isobutanol.

7. The thermoplastic composition of claim 1 wherein the blowing agent further comprises an atmospheric gas.

8. The thermoplastic composition of claim 1 wherein the blowing agent further comprises a hydrocarbon.

9. The thermoplastic composition of claim 1 wherein the blowing agent further comprises a hydrohalocarbon.

10. The thermoplastic composition of claim 1 wherein the polyvinyl alcohol material is up to 99.9% hydrolyzed.

11. The composition of claim 1 wherein the concentration of the blowing agent is about 0.1 to about 0.35 parts per part resin mixture.

12. The composition of claim 1 wherein the concentration of the blowing agent is about 0.15 to about 0.33 parts per part resin mixture.

13. The composition of claim 2 wherein the ionomer resin concentration is up to about 10% by weight of the resin mixture.

14. The composition of claim 2 wherein the nucleating agent is selected from the group consisting of talc, diatomaceous earth, and mixtures of sodium bicarbonate and citric acid, and said nucleating agent is present in an amount from about 0.1 to about 1% by weight of the resin mixture.

15. The composition of claim 2 wherein the nucleating agent concentration is from about 0.1 by weight to about 0.6% by weight of the resin mixture.

16. The composition of claim 2 wherein the aging modifier is glycerol monostearate, and said modifier is present in an amount from about 0.1 to about 2% by weight of the resin mixture.

17. The composition of claim 2 wherein the aging modifier concentration is up to about 1% by weight.

18. A thermoplastic foamable composition comprising:
   (a) a resin mixture comprising
      1) from about 95 to about 100% by weight of a polyvinyl alcohol material,
      2) from 0 to about 2% by weight of a nucleating agent, and
      3) from 0 to about 3% by weight of an aging modifier; and
   (b) a blowing agent comprising a low molecular weight alcohol, said alcohol present in an amount from about to about 0.5 parts per part resin mixture; wherein said composition is extrudable into a foam that entirely dissolves in water.

19. A thermoplastic foamable composition comprising:
   (a) a resin mixture comprising
      1) from about 75 to about 100% by weight of a polyvinyl alcohol material,
      2) from 0 to about 25% by weight of a diluent polymer,
      3) from 0 to about 20% by weight of an ionomer resin,
      4) from 0 to about 2% by weight of a nucleating agent,
      5) from 0 to about 3% by weight of an aging modifier; and
   (b) a blowing agent comprising a low molecular weight alcohol, said alcohol present in an amount from about 0.1 to about 0.5 parts per part resin mixture;
   wherein said composition is extrudable into a foam that substantially dissolves in water.

20. A thermoplastic foamable composition comprising:
   (a) a resin mixture comprising
      1) from about 40 to about 75% by weight of a polyvinyl alcohol material,
      2) from 30 to about 60% by weight of a diluent polymer,
      3) from about 5 to about 20% by weight of an ionomer resin,
      4) from 0 to about 2% by weight of a nucleating agent, and
      5) from 0 to about 3% by weight of an aging modifier; and
   (b) a blowing agent comprising a low molecular weight alcohol, said alcohol present in an amount from about to about 0.5 parts per part resin mixture;
   wherein said composition is extrudable into a foam that partially dissolves in water.

21. A thermoplastic foamable composition comprising:
   (a) a resin mixture comprising
      1) from about 5 to about 40% by weight of a polyvinyl alcohol material,
      2) from 60 to about 90% by weight of a diluent polymer,
      3) from about 5 to about 20% by weight of an ionomer resin,
      4) from 0 to about 2% by weight of a nucleating agent, and
      5) from 0 to about 3% by weight of an aging modifier; and
   (b) a blowing agent comprising a low molecular weight alcohol, said alcohol present in an amount from about 0.1 to about 0.5 parts per part resin mixture;
   wherein said composition is extrudable into a foam that minimally dissolves in water.

22. An extruded foam comprising:
   (a) from about 75 to 100% by weight of a polyvinyl alcohol material;
   (b) from 0 to about 30% by weight of a diluent to about 20% by weight of an ionomer
   (c) from 0 to about 20% by weight of an ionomer resin;
   (d) from 0 to about 2% by weight of a nucleating agent; and
   (e) from 0 to about 3% by weight of an aging wherein said foam will substantially dissolve in 23. An extruded foam comprising:
   (a) from about 40 to about 75% by weight of a polyvinyl alcohol material;
   (b) from about 30 to about 60% by weight of a diluent polymer;
   (c) from about 5 to about 20% by weight of an ionomer resin;
   (d) from 0 to about 2% by weight of a nucleating agent; and
   (e) from 0 to about 3% by weight of an aging modifier;
   wherein said foam will partially dissolve in water.

24. An extruded foam comprising:
   (a) from about 5 to about 40% by weight of a polyvinyl alcohol material;
   (b) from about 60 to about 90% by weight of a diluent polymer;
   (c) from about 5 to about 20% by weight of an ionomer resin;
   (d) from 0 to about 2% by weight of a nucleating agent; and
   (e) from 0 to about 3% by weight of an aging modifier;
   wherein said foam will minimally dissolve in water.

25. A method of fabricating a water soluble foam comprising: melt extruding a resin mixture comprising
   (a) 1 to 100% by weight of a polyvinyl alcohol material;
   (b) from 0 to about 90% by weight of a diluent polymer;
   (c) from 0 to about 20% by weight of an ionomer resin;
   (d) from 0 to about 5% by weight of a nucleating agent; and
   (e) from 0 to about 10% by weight of an aging modifier; thoroughly working the blowing agent into solution with the resin mixture in the mixing section of the extruder; and allowing the composition to extrude under increased pressure and heat through a die such that it forms a foam.

* * * * *

UNITED STATES PATENT AND TRADEMARK OFFICE
CERTIFICATE OF CORRECTION

PATENT NO. : 5,089,535
DATED : Feb. 18, 1992
INVENTOR(S) : Malwitz et al.

It is certified that error appears in the above-identified patent and that said Letters Patent is hereby corrected as shown below:

On the title Page, Item [56], U.S. PATENT DOCUMENTS, delete "4,778,829" and substitute --4,770,029-- therefor.

Title page, Item [56], FOREIGN PATENT DOCUMENTS, delete "5/1986" and substitute --5/1966-- therefor.

At column 5, line 3, insert --.-- after "thereof".

At column 5, line 50, delete "I5".

At column 9, line 21, after "from about" insert --0.1--.

At column 9, line 22, start a new paragraph with the words "wherein said composition".

At column 9, line 58, after "from about" insert --0.1--.

At column 10, lines 18-19, delete "to about 20% by weight of an ionomer" and substitute --polymer;-- therefor.

UNITED STATES PATENT AND TRADEMARK OFFICE
CERTIFICATE OF CORRECTION

PATENT NO. : 5,089,535
DATED : February 18, 1992
INVENTOR(S) : Malwitz et al.

It is certified that error appears in the above-identified patent and that said Letters Patent is hereby corrected as shown below:

At column 10, lines 24-25, delete "wherein said foam will substantialy dissolve in" and substitute --modifier;

wherein said foam will substantially dissolve in water.-- therefor.

Signed and Sealed this

First Day of June, 1993

Attest:

MICHAEL K. KIRK

Attesting Officer

Acting Commissioner of Patents and Trademarks